US012748834B1

(12) United States Patent
Solomon

(10) Patent No.: US 12,748,834 B1
(45) Date of Patent: Sep. 29, 2026

(54) DETERMINING POLICY-BASED CONTROLS FOR REAL-TIME SECURITY AND COMPLIANCE MONITORING

(71) Applicant: DRATA INC., San Diego, CA (US)

(72) Inventor: Lior Solomon, Haworth, NJ (US)

(73) Assignee: DRATA INC., San Diego, CA (US)

( * ) Notice: Subject to any disclaimer, the term of this patent is extended or adjusted under 35 U.S.C. 154(b) by 225 days.

(21) Appl. No.: 18/677,806

(22) Filed: May 29, 2024

(51) Int. Cl.
*G06F 21/50* (2013.01)

(52) U.S. Cl.
CPC ........ *G06F 21/50* (2013.01); *G06F 2221/034* (2013.01)

(58) Field of Classification Search
None
See application file for complete search history.

(56) References Cited

U.S. PATENT DOCUMENTS 7,536,456 B2 5/2009 Williams et al.
8,225,371 B2 * 7/2012 Jones .................. G06Q 10/107 707/999.102
10,205,593 B2 2/2019 Biesinger et al.
10,922,423 B1 * 2/2021 Rungta ................. G06F 21/604
2007/0180490 A1 8/2007 Renzi et al.
2008/0083012 A1 * 4/2008 Yu ...................... H04L 63/1441 726/1
2024/0143774 A1 * 5/2024 Ramirez-Cunarro ........................ G06F 21/577
2024/0256663 A1 * 8/2024 Thompson ............ G06F 21/554
2024/0265106 A1 * 8/2024 Mehta ..................... G06F 21/57
2025/0053662 A1 * 2/2025 Misra .................... G06F 21/577
2025/0131093 A1 4/2025 Sharieh et al.
2025/0272317 A1 8/2025 Aggarwal et al.
2025/0363076 A1 * 11/2025 Green ................ G06F 16/2455

* cited by examiner

*Primary Examiner* — Jeffrey R Swearingen

(57) ABSTRACT

Determining policy-based controls for real-time security and compliance monitoring including receiving, by a security and compliance monitor from a user computing system, a user-generated policy document associated with an organization; converting, by the security and compliance monitor, the user-generated policy document into a user-generated policy code; matching, by the security and compliance monitor, the user-generated policy code to a template policy code within a template policy code repository; determining, by the security and compliance monitor, a set of controls associated with the matched template policy document, wherein each of the set of controls is a measurable component exposed by a services provider of the organization; and presenting, by the security and compliance monitor on the user computing system, the set of controls associated with the matched template policy document as controls for the user-generated policy document.

20 Claims, 7 Drawing Sheets

DETERMINING POLICY-BASED CONTROLS FOR REAL-TIME SECURITY AND COMPLIANCE MONITORING

DESCRIPTION OF EMBODIMENTS

Many businesses employ external service providers to perform various aspects of the business's operations. At the same time, businesses are increasingly subject to regulations and standards that require specific procedures to be followed and documented. As businesses continue to expand utilization of cloud-based systems and services, the need for monitoring the security, privacy, and confidentiality of data that passes through or is stored on the third-party systems and services also increases.

Figure 1:
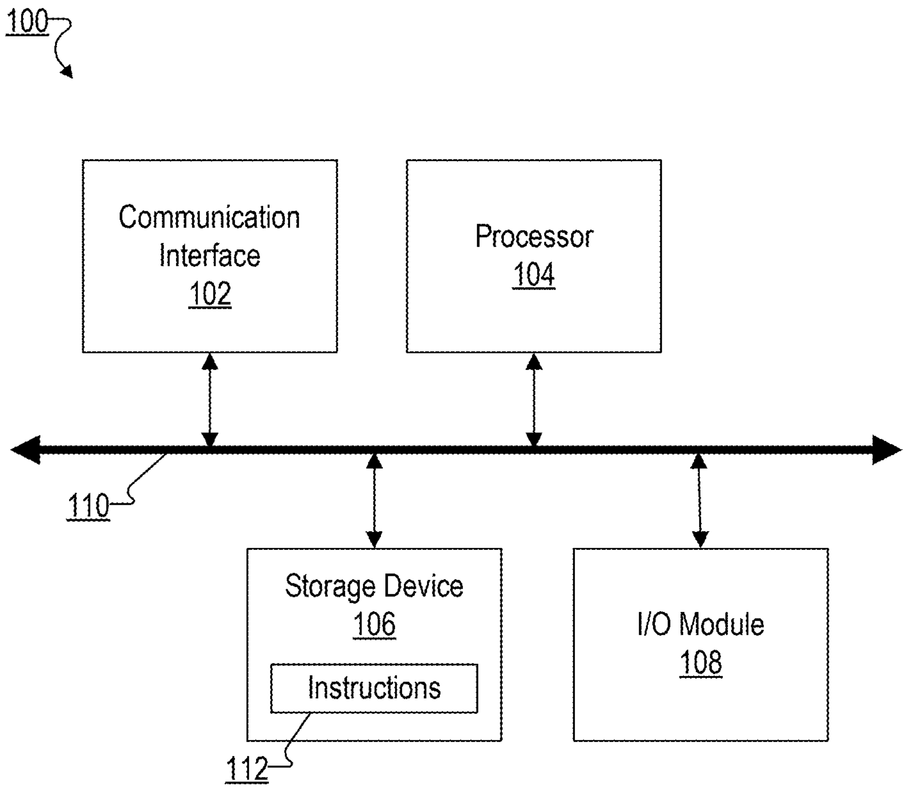
FIG. 1 illustrates an example computing device for security and compliance monitoring in accordance with some implementations.

Example methods, apparatus, and products for determining policy-based controls for real-time security and compliance monitoring in accordance with embodiments of the present disclosure are described with reference to the accompanying drawings, beginning with FIG. 1. FIG. 1 illustrates an exemplary computing device 100 that may be specifically configured to perform one or more of the processes described herein. As shown in FIG. 1, computing device 100 may include a communication interface 102, a processor 104, a storage device 106, and an input/output ("I/O") module 108 communicatively connected one to another via a communication infrastructure 110. While an exemplary computing device 100 is shown in FIG. 1, the components illustrated in FIG. 1 are not intended to be limiting. Additional or alternative components may be used in other embodiments. Components of computing device 100 shown in FIG. 1 will now be described in additional detail.

Communication interface 102 may be configured to communicate with one or more computing devices. Examples of communication interface 102 include, without limitation, a wired network interface (such as a network interface card), a wireless network interface (such as a wireless network interface card), a modem, an audio/video connection, and any other suitable interface.

Processor 104 generally represents any type or form of processing unit capable of processing data and/or interpreting, executing, and/or directing execution of one or more of the instructions, processes, and/or operations described herein. Processor 104 may perform operations by executing computer-executable instructions 112 (e.g., an application, software, code, and/or other executable data instance) stored in storage device 106.

Storage device 106 may include one or more data storage media, devices, or configurations and may employ any type, form, and combination of data storage media and/or device. For example, storage device 106 may include, but is not limited to, any combination of non-volatile media and/or volatile media. Electronic data, including data described herein, may be temporarily and/or permanently stored in storage device 106. For example, data representative of computer-executable instructions 112 configured to direct processor 104 to perform any of the operations described herein may be stored within storage device 106. In some examples, data may be arranged in one or more databases residing within storage device 106.

I/O module 108 may include one or more I/O modules configured to receive user input and provide user output. I/O module 108 may include any hardware, firmware, software, or combination thereof supportive of input and output capabilities. For example, I/O module 108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 108 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 100.

Figure 2:
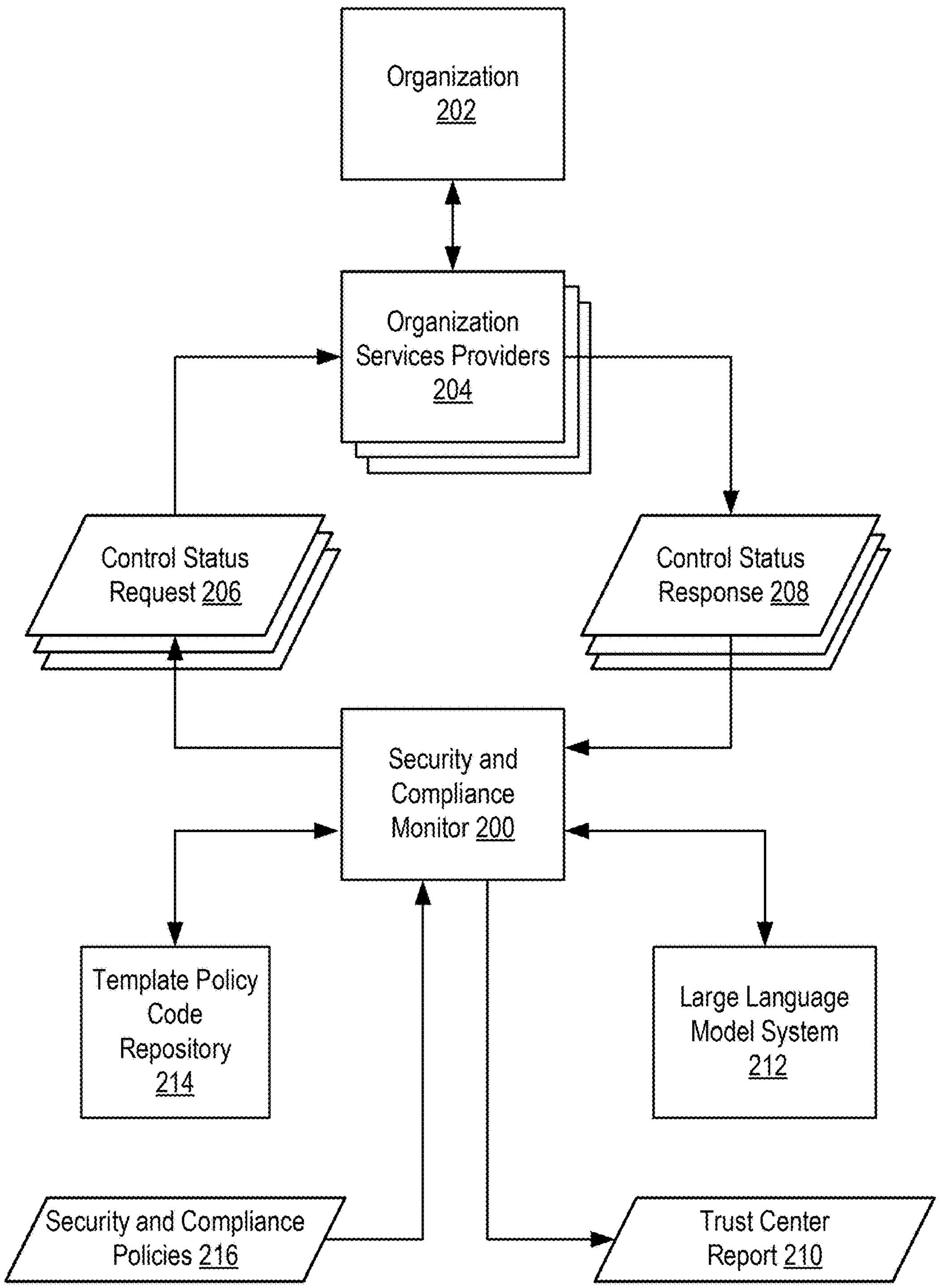
FIG. 2 illustrates an example system for security and compliance monitoring in accordance with some implementations.

For further explanation, FIG. 2 illustrates an exemplary block diagram depicting a system for security and compliance monitoring in accordance with some embodiments of the present disclosure. The system of FIG. 2 includes a security and compliance monitor 200, an organization 202, multiple organization services providers 204, a template policy code repository 214, and a large language model (LLM) system 212. The security and compliance monitor 200 uses the security and compliance policies 216 to determine a set of controls on the organization services providers to query. The security and compliance monitor 200 also issues control status requests 206 to the organization services providers 204 and, in response, receives the control status responses 208. The security and compliance monitor 200 further uses the control status responses 208 to generate the trust center report 210.

Each element presented may be hosted by, or be comprised of, one or more computing systems (not shown). Specifically, the security and compliance monitor 200 may be hosted by one or more security and compliance monitor computing systems, the organization 202 may include multiple organization computing systems, each organization services provider 204 may be hosted by one or more cloud-based services provider computing systems, and the LLM system 212 may be hosted by one or more LLM computing systems.

The security and compliance monitor 200 is hardware, software, or an aggregation of hardware and software configured to determine a degree to which an organization 202 is complying with a particular security and compliance policy. Specifically, the security and compliance monitor 200 monitors a set of controls for service providers that support the organization 202. Each control monitored by the security and compliance monitor 200 is associated with at least one element of a security and compliance policy. The security and compliance monitor 200 uses the status of each control to compile the trust center report 210 detailing the compliance status of the organization 202 with regard to the security and compliance framework.

The organization 202 is a cloud-based services client. The organization 202 is also an entity that utilizes the services provided by the organization services providers 204. The organization 202 may be an organization that itself provides a service or product to other clients utilizing the collection of services supplied by the organization services providers 204. For example, the organization 202 may be a software developer that utilizes cloud-based services including cloud-based storage, cloud-based development tools, cloud-based ticketing, and cloud-based human resources.

The organization 202 may be a "cloud-native" organization that creates products using cloud-based services providers. The organization 202 may be "cloud-first" and exclusively utilize computing resources, applications, and systems provided by organization services providers 204 for some or all aspects of the organization. Regardless of the level of reliance on organization services providers 204, in order to be in full compliance with any legally- or operationally-required policies and frameworks, the organization 202 must verify that each organization services providers 204 is operating in a manner consistent with those frameworks.

The organization services providers 204 are entities that supply a resource or product to the organization 202 over a wide-area network. Each organization services providers 204 may be a cloud-based services provider and include a collection of computer systems working in concert to provide the resource or product over the Internet (examples of which are described below in reference to FIG. 3). In addition to providing the resource or product, each organization services providers 204 also exposes an interface allowing the security and compliance monitor 200 to retrieve control statuses from the organization services providers 204.

The organization 202 may utilize other services that are not cloud-based services (relative to the organization 202). Specifically, the organization 202 may include services (e.g., enterprise productivity suites, virtualization software, etc.) provided by other entities and hosted on computing systems under the control of organization 202 (i.e., not on a separate services provider system). For such services, the security and compliance monitor 200 sends the control status requests 206 to the computing systems of the organization 202 instead of a third-party computing system.

As discussed above, the organization 202 is an entity obligated to abide by security and compliance policies 216 (including standards frameworks) for legal and/or business purposes. A security and compliance policy 216 is a group of assurances and procedures related to the manner in which an organization conducts its operation. A standards framework (also referred to as a security and compliance framework) defines procedures that must be followed, tracked, and documented in order to comply with the particular law or standard around which the framework has been constructed. Many policies and standards frameworks describe the manner in which customer or employee data must be managed. Other policies and standards frameworks describe the disclosure or training obligations to employees or customers. A policy document is data storing a security and compliance policy, such as a text file.

Each security and compliance policy 216 may be composed of human-readable text detailing the obligations of the entity to be in compliance with the policy. Each obligation may be tracked using a control. A control is a measurable component exposed by a services provider. For example, one obligation of a policy may dictate that, when stored, user data must be encrypted using a specified minimum standard. This obligation may be tracked using two controls: a first control may be whether or not the user data is encrypted and a second control may be the level of encryption employed.

A control status is the state of the control retrieved from the services provider (e.g., organization services providers 204). The control status may be a Boolean response (i.e., true or false), a selection from a group (e.g., low, medium, or high), or some other form of data. The control status is retrieved from the services provider using a control status request 206 and control status response 208. A control status request 206 is a message targeting a particular services provider 204 requesting information about a control. The control status request 206 may include code that instructs the particular services provider 204 to generate a control status response 208. A control status response 208 is a message that describes the state of a particular control within the services provider 204. The control status responses 208 may be in the form of a state specification. A state specification is a collection of data that conveys data objects from one system to another. The state specification may be a standard file format used to exchange data in asynchronous browser-server communication. For example, the state specification may be a JavaScript Object Notation specification.

The LLM system 212 is a system for processing natural language. The LLM system 212 receives queries for processing natural language, such as a request to summarize text or to compare two or more sets of text, and responds with a query response based on the requested output. Communication with the LLM system 212 may be performed using application programming interface (API) calls to the LLM system.

The template policy code repository 214 is a collection of template policy codes. A template policy code is data that represents a template policy mathematically. Specifically, each template policy code is the output of a conversion process applied to a particular template policy document and utilized for greater comparability (relative to the human-readable form of the template policy document). The template policy code repository 214 may be a data structure stored within memory accessible by the security and compliance monitor 200. The template policy code repository 214 may be, for example, a vector database with the template policy codes ingested using embedding documents. The template policy code repository 214 is used to determine a template policy document that is the closest match to a given user-generated policy document (as described below in FIGS. 5-7).

The trust center report 210 is a collection of control statuses that correspond to the obligations of a particular security and compliance policy. The trust center report 210 conveys the compliance state of the organization with regard to the particular security and compliance policy using the control statuses of each control. The trust center report 210 may be provided in response to a request by an auditor or organization client. Further, the trust center report 210 may be generated in response to regulatory obligations or as a condition of a particular business agreement.

Figure 3:
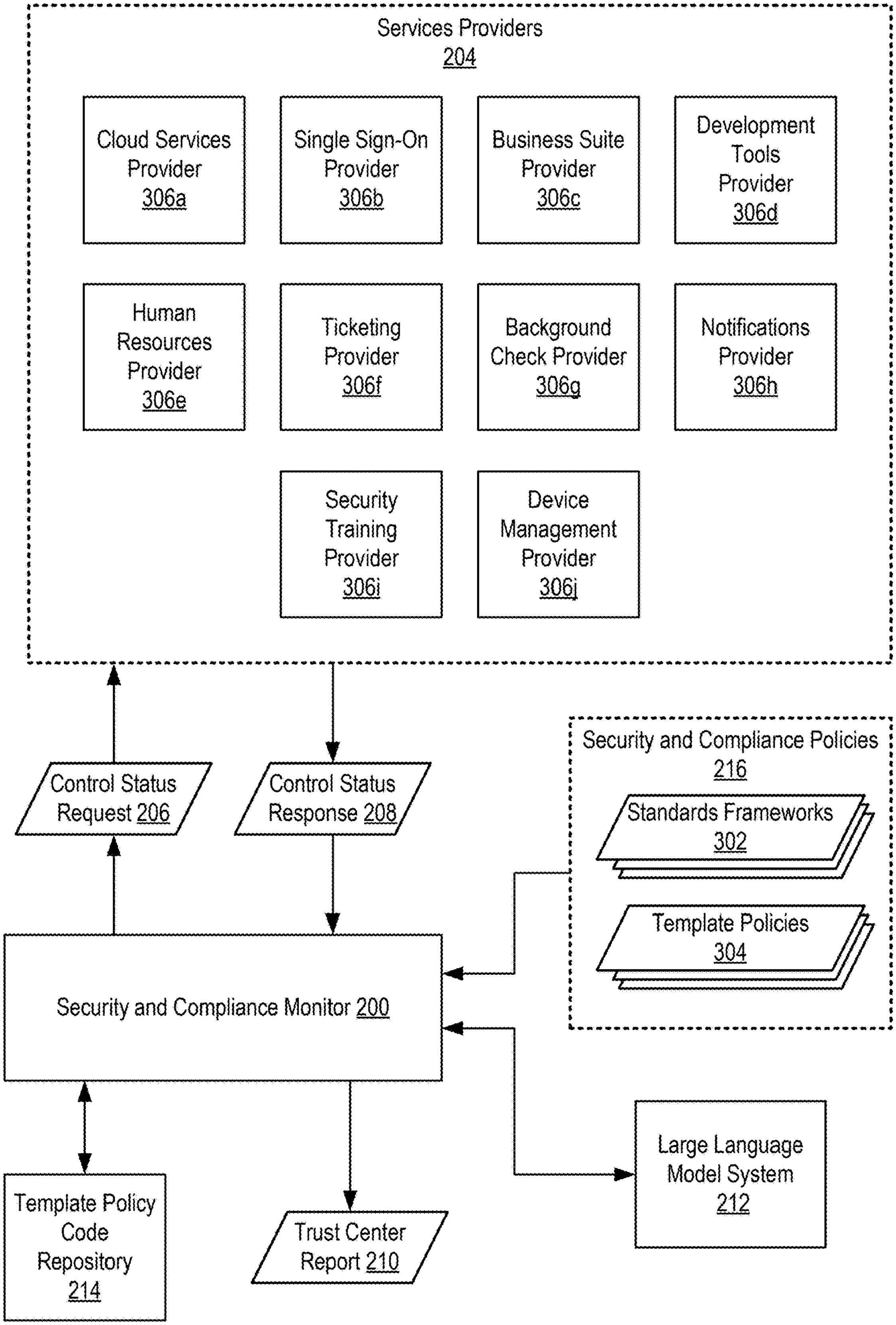
FIG. 3 illustrates an example system for security and compliance monitoring in accordance with some implementations.

For further explanation, FIG. 3 illustrates an exemplary block diagram depicting a system for security and compliance monitoring in accordance with some embodiments of the present disclosure. Specifically, the system of FIG. 3 includes details of the interactions between the security and compliance monitor 200 and service providers 204 using the security and compliance policies 216. FIG. 3 also shows example services providers 204 from which control statuses are retrieved.

The services providers 204 in FIG. 3 include a cloud services provider 306*a*, a single sign-on provider 306*b*, business suite provider 306*c*, a development tools provider 306*d*, a human resources provider 306*e*, a ticketing provider 306*f*, a background check provider 306*g*, a notifications provider 306*h*, a security training provider 306*i*, and a device management provider 306*j*.

A cloud services provider 306*a* is a supplier of a cloud-based platform, infrastructure, application or storage services. Examples of controls for cloud services providers 306*a* include frequency of data backups, level of data security, and location of stored data. A single sign-on provider 306*b* is a supplier of authentication across multiple third-party applications. Examples of controls for single sign-on providers include access controls, level of access for each user, and role-level security. A business suite provider 306*c* is a supplier of business applications for communications and data operations across and within businesses. Examples of controls for business suite providers include customer data handling, data access controls, and communications data security. A development tools provider 306*d* is a supplier of applications that allow developers to create, test and debug software. Examples of controls for development tools providers include customer data handling, best practices implementations, and data access controls.

A human resources provider 306*e* is a supplier of employee management software and services. Examples of controls for human resources providers include employee data security and employee safety metrics. A ticketing provider 306*f* is a supplier of applications and services for addressing information technology issues. Examples of controls for ticketing providers include data access controls, employee data security, and customer data security. A background check provider 306*g* is a supplier of services to review potential employee's criminal, commercial and financial records. Examples of controls for background check providers include employee data security and potential employee data security. A notifications provider 306*h* is a supplier of communications applications for an enterprise environment. Examples of controls for notifications providers include employee data security and communications data security. A security training provider 306*i* is a supplier of training systems for enterprise employees. Examples of controls for security training providers include training completion level for each employee, and employee data security. A device management provider 306*j* is a supplier of services that control data, configuration settings and applications on all devices used within an enterprise. Examples of controls for device management providers include device security, device access controls, and employee data security. As discussed above, the services providers may include services that are not cloud-based services.

The security and compliance policies 216 include both standards frameworks 302 and template policies 304. As discussed above, a standards framework 302 defines procedures that must be followed, tracked, and documented in order to comply with the particular law or standard around which the framework has been constructed. The standards frameworks 302 may include, for example, a System and Organization Controls (SOC) framework, an International Organization for Standardization (ISO) framework, a Health Insurance Portability and Accountability Act (HIPAA) framework, a General Data Protection Regulation (GDPR) framework, a Sarbanes-Oxley Act (SOX) framework, a Payment Card Industry Data Security Standard (PCI DSS) framework, and a California Consumer Privacy Act (CCPA) framework.

The template policies 304 are security and compliance policies that include standard, common, and/or general obligations related to the policy purpose. Examples of template policies include privacy policies, data governance policies, and cyber security policies.

In order to instill confidence in their clients, an organization may provide a trust center report 210. A trust center report 210 is a presentation of information about an organization's practices, policies, and procedures on privacy, security, transparency, and compliance. An automated trust center is a trust center report 210 in which the status of the controls that make up the trust center are retrieved and updated automatically (e.g., by a security and compliance monitor 200). An automated trust center that provides real-time security and compliance monitoring is a trust center that reflects the current status of each control with minimal delay for retrieval and/or based on a service level agreement.

Figure 4:
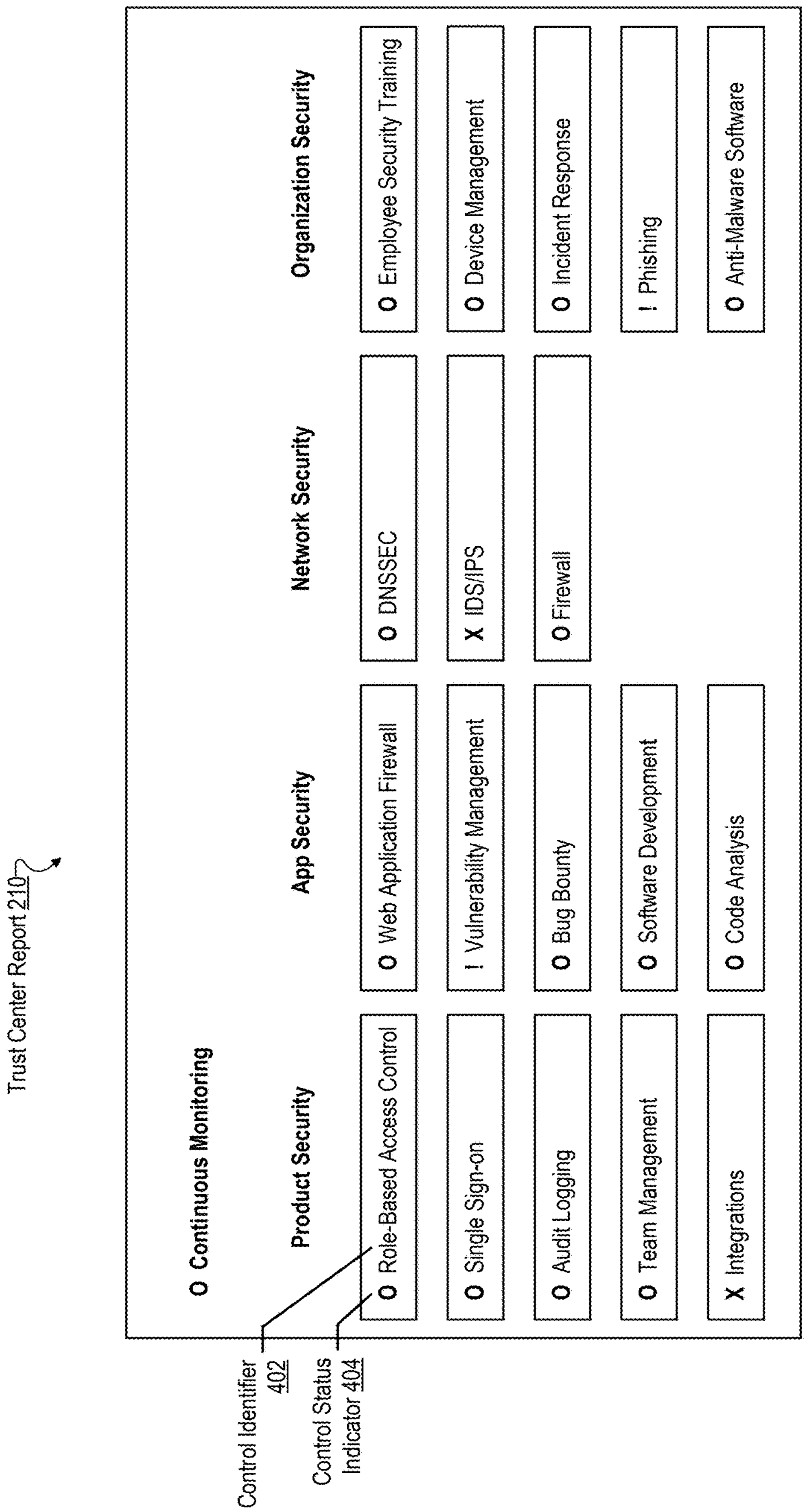
FIG. 4 illustrates an example trust center report in accordance with some implementations.

For further explanation, FIG. 4 illustrates an exemplary trust center report 210 in accordance with some embodiments of the present disclosure. As discussed above, a trust center report 210 is a collection of control statuses for controls selected for the trust center. The trust center controls may be selected as those of particular interest to organization clients. Alternatively, or additionally, the trust center controls may be selected from a widely-used standards framework. The trust center report 210 may be embodied as a dynamic webpage retrievable via a link within the organization's domain. Although appearing to be part of the organization's website, when requested, some or all of the webpage may be retrieved from the security and compliance monitor.

As shown in FIG. 4, the trust center report 210 presents controls and the associated control statuses retrieved by the security and compliance monitor. The trust center report 210 includes a control identifier 402 for each control and a control status indicator 404 that displays a symbol to signify the status of the associated control. Specifically, a control status indicator 404 of "O" indicates that the control is in compliance, a control status indicator 404 of "!" indicates that the control is out of compliance but not yet failing, and a control status indicator 404 of "X" indicates that the control is failing. The amount of time before a failed test for a control renders that control to be out-of-compliance may be set by the organization via a service level agreement (SLA) with the security and compliance monitor, based on the compliance standard itself, set by the platform globally for all organization's trust center, or set by the platform for the entity based on a variety of factors of the organization (organization size, type of organization, business segment of the organization, age of the organization, and so on). The security and compliance monitor, when hosting trust centers for organizations, may enable an organization to customize the trust center for branding purposes.

In some implementations, clicking on any of these controls may provide various information to a user of the trust center report 210. For example, clicking on an anti-DDoS control may provide a user with the various protocols or hardware in place to rebuff such DDoS attacks. The trust center report 210 may also provide evidence of the monitoring when a control is clicked on. That is, when clicking on, for example, "Single Sign On," not only might trust center provide details regarding the IDP utilized by the entity to provide single sign on, but also the date, time, and specifics of a recent test of the entities IDP in practice.

While particular combinations of various functions and features of the one or more embodiments are expressly described herein, other combinations of these features and functions are likewise possible. The present disclosure is not limited by the particular examples disclosed herein and expressly incorporates these other combinations.

Figure 5:
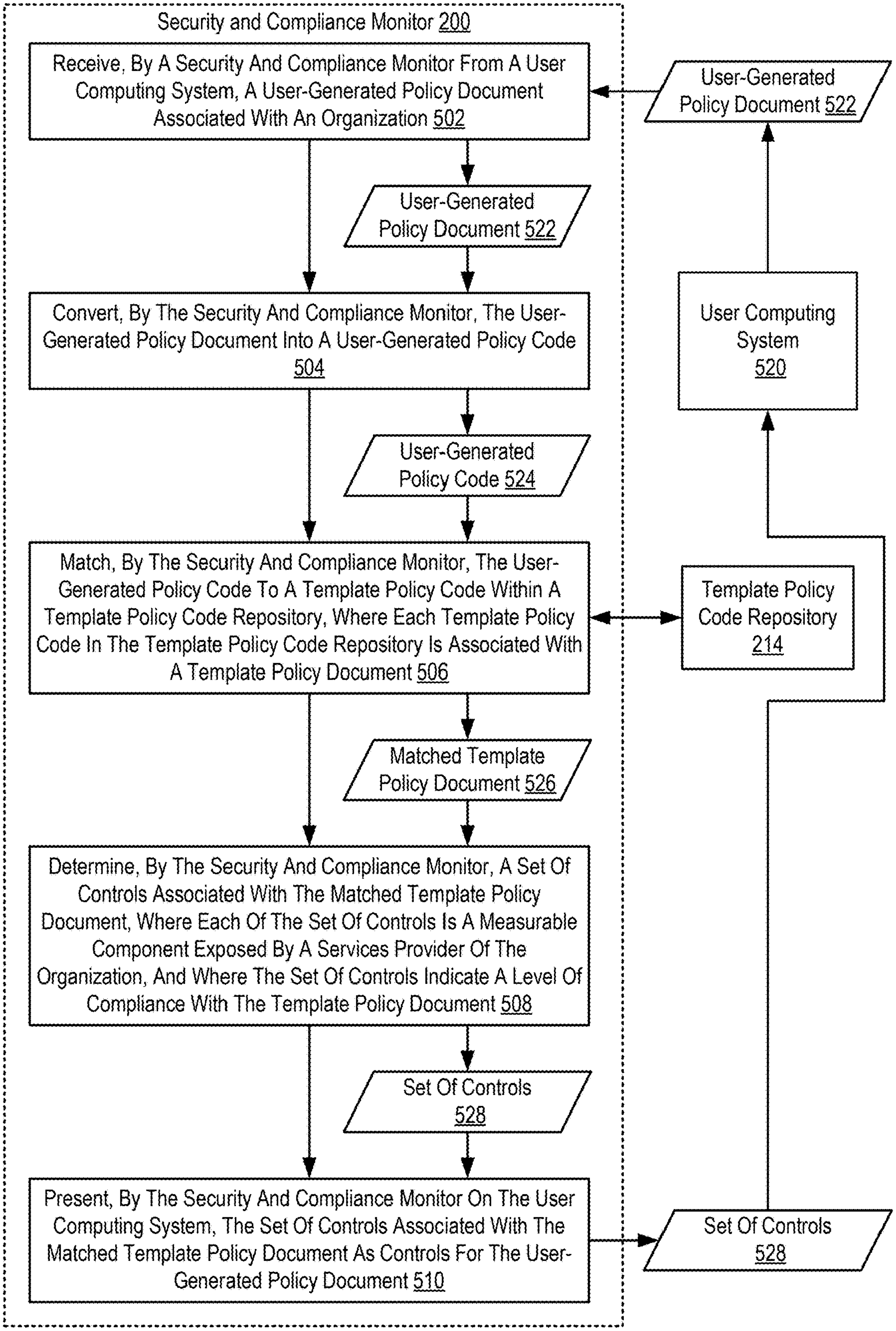
FIG. 5 sets forth a flow chart illustrating an exemplary method for determining policy-based controls for real-time security and compliance monitoring according to embodiments of the present invention.

For further explanation, FIG. 5 sets forth a flow chart illustrating an exemplary method for a determining policy-based controls for real-time security and compliance monitoring according to embodiments of the present invention. Although depicted in less detail, the system may include some or all of the components described above. The example method depicted in FIG. 5 may be used if a security and compliance monitor 200 is tasked with creating a trust center report for a user-generated policy (instead of a template policy or framework known to the security and compliance monitor 200). In such a case, the security and compliance monitor 200 must determine a set of controls for the user-generated policy.

The example method depicted in FIG. 5 includes receiving 502, by a security and compliance monitor 200 from a user computing system 520, a user-generated policy document 522 associated with an organization. Receiving 502 the user-generated policy document 522 may be carried out by a user of the user computing system 522 uploading the user-generated policy document 522 or otherwise sending the user-generated policy document 522 to the security and compliance monitor 200. The data comprising the user-generated policy document 522 may be received by the security and compliance monitor 200 as a data file storing the text of the user-generated policy. Alternatively, the text of the user-generated policy from within the user-generated policy document 522 may be entered into a text field on a form presented by security and compliance monitor 200.

The user-generated policy document 522 is data that includes a policy in force (or planning to be in force) by an organization. Further, the user-generated policy document 522 is a policy document and policy that the security and compliance monitor 200 has not yet encountered. Specifically, the user-generated policy document 522 includes a policy that is not included in the security and compliance policies accessible by the security and compliance monitor 200. The user-generated policy document 522 may include a policy that was drafted specifically for the particular organization and has been implemented by that organization. The user-generated policy document 522 may be, for example, a privacy policy, data governance, HR policy, or any other policy in force (or planning to be in force) by the organization. The user computing system 520 is a computing system under the control of a user working on behalf of the organization.

The method of FIG. 5 also includes converting 504, by the security and compliance monitor 200, the user-generated policy document 522 into a user-generated policy code 524. Converting 504 the user-generated policy document 522 into a user-generated policy code 524 may be carried out by processing the user-generated policy document 522 for greater comparability (relative to the human-readable form of the user-generated policy document 522) to the template policies. The user-generated policy code 524 is data that represents the user-generated policy mathematically. Processing the user-generated policy document 522 into the user-generated policy code 524 may include applying an algorithm (such as a hash function) that converts the user-generated policy document 522 into an alpha-numerical, numerical, or binary representation. For example, the user-generated policy document 522 may be converted into the user-generated policy code 524 using vectorization. Text vectorization is the process of converting text into a vector of real numbers. The user-generated policy document 522 may be converted into the user-generated policy code 524 in the same manner that each of the template policies are converted into the template policy codes within the template policy code repository 214.

The method of FIG. 5 also includes matching 506, by the security and compliance monitor 200, the user-generated policy code 524 to a template policy code within a template policy code repository 214, wherein each template policy code in the template policy code repository 214 is associated with a template policy document. Matching 506 the user-generated policy code 524 to a template policy code within a template policy code repository 214 may be carried out by the security and compliance monitor 200 searching the template policy code repository 214 to determine the most similar template policy code to the user-generated policy code. The user-generated policy code may be used as a key into the template policy code repository 214 to find a best-matching template policy code. The user-generated policy code 524 may be compared to each template policy code in the template policy code repository 214 and a template policy code that differs the least from the user-generated policy code 524 may be selected as the best-matching template policy code. For example, a user-generated policy code may be matched to a template policy code based on similarities between the vectors of each code. Consequently, the template policy document corresponding to the best-matching template policy code may then be selected as the matched template policy document 526.

Each template policy code in the template policy code repository 214 may be generated by the security and compliance monitor 200 dividing each template policy document into chunks and creating a mathematical representation of (e.g., vectorizing) each of the chunks to create the template policy code. Specifically, each template policy document may be separated into individual sections, such as single paragraphs. An algorithm is then applied to convert each individual section into a template policy code. The template policy code may include an identifier of the template policy and template policy section from which the template policy code has been created, allowing the security and compliance monitor 200 to retrieve the corresponding matched template policy once the user-generated policy code has been matched to a template policy code.

The method of FIG. 5 also includes determining 508, by the security and compliance monitor 200, a set of controls 528 associated with the matched template policy document 526, wherein each of the set of controls 528 is a measurable component exposed by a services provider of the organization, and wherein the set of controls 528 indicate a level of compliance with the template policy document 526. Determining 508 the set of controls 528 associated with the matched template policy document 526 may be carried out by using an identifier of the matched template policy document 526 to select the corresponding set of controls 528. As discussed above, the set of controls for a security and compliance policy are the measurable translations of each obligation within the policy. Each template policy has been mapped to a set of controls that measure compliance with that policy. Such a mapping may be stored as a data structure that associates a particular template policy with the set of controls.

For example, an employee of a new social media company may draft a policy about how the social media company handles network security. That employee may provide the network security policy to the security and compliance monitor 200. Once the network security policy is converted into a user-generated policy code, the security and compliance monitor 200 may then match the user-generated policy code to a template computer security policy based on the similarity between the two codes. The security and compliance monitor 200 may then access a data structure that lists the controls for the template computer security policy in an entry for the template computer security policy. Such controls may include whether the WIFI password of the network is at least WPA2, whether a network firewall has been implemented, the type of identity and access management implemented, etc. Some, most, or all of the set of controls may be applicable for the network security policy of the new social media company.

The method of FIG. 5 also includes presenting 510, by the security and compliance monitor 200 on the user computing system 520, the set of controls 528 associated with the matched template policy document 526 as controls for the user-generated policy document 522. Presenting 510 the set of controls 528 associated with the matched template policy document 526 as controls for the user-generated policy document 522 may be carried out by sending a list of the set of controls 528 to the user computing system 520. Each control may have an explanation of that control's purpose and how the control may be accessed. The set of controls presented may include a link or other mechanism to implement the controls within the organization. For example, the user of the user computing system 520 may be prompted to grant the security and compliance monitor 200 access to the exposed APIs of the service providers relevant to each control.

The above steps improve the operation of the computer system by allowing a user to submit an original policy to the security and compliance monitor 200 and receive a suggested set of controls for that policy. This is accomplished by converting the original policy to a policy code, matching the policy code to the policy code of a template policy, and providing the set of controls for the template policy as suggested controls for the original policy.

Figure 6:
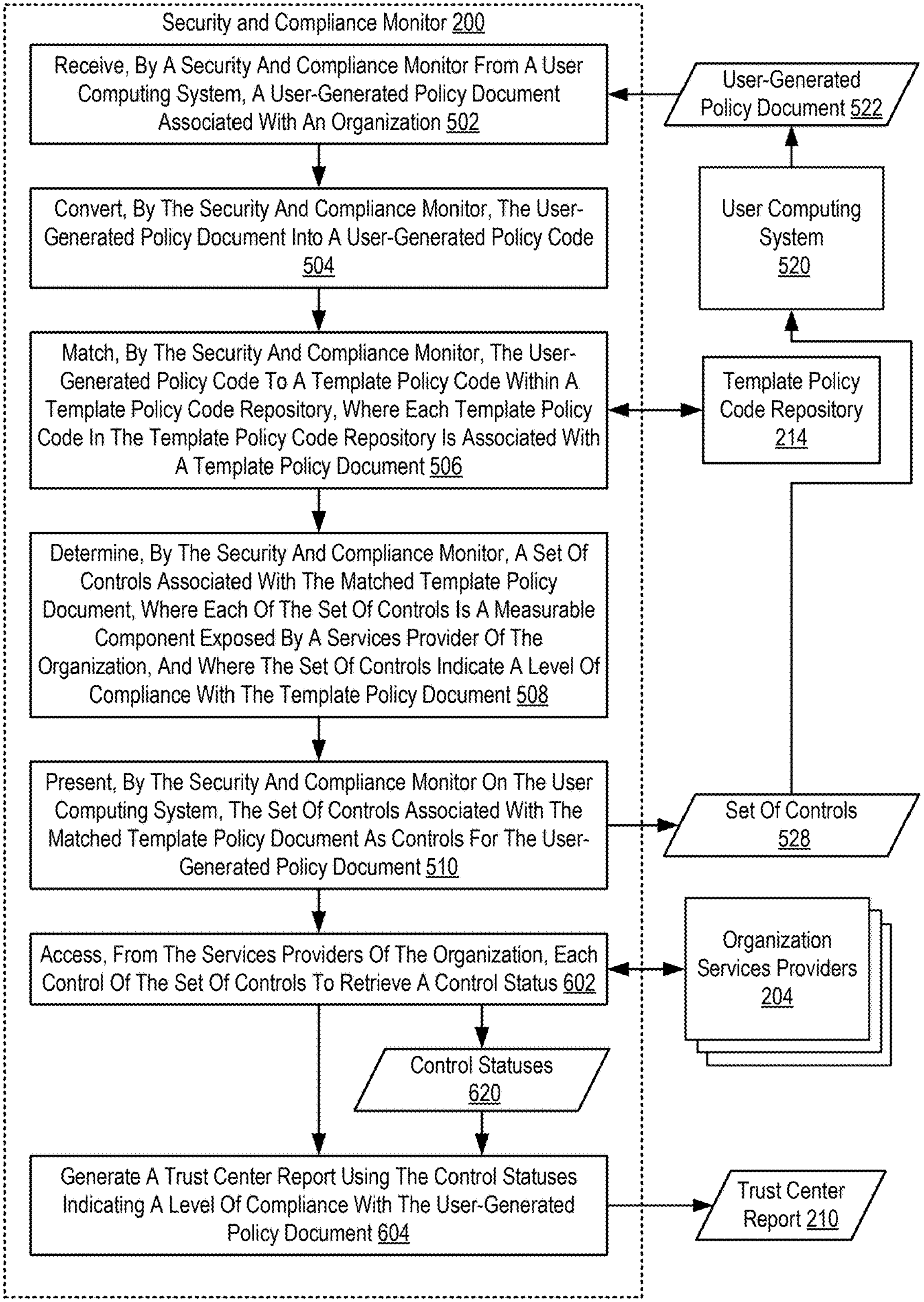
FIG. 6 sets forth a flow chart illustrating an exemplary method for determining policy-based controls for real-time security and compliance monitoring according to embodiments of the present invention.

For further explanation, FIG. 6 sets forth a flow chart illustrating a further exemplary method for determining policy-based controls for real-time security and compliance monitoring according to embodiments of the present invention that includes receiving 502, by a security and compliance monitor 200 from a user computing system 520, a user-generated policy document 522 associated with an organization; converting 504, by the security and compliance monitor 200, the user-generated policy document 522 into a user-generated policy code 524; matching 506, by the security and compliance monitor 200, the user-generated policy code 524 to a template policy code within a template policy code repository 214, wherein each template policy code in the template policy code repository 214 is associated with a template policy document; determining 508, by the security and compliance monitor 200, a set of controls 528 associated with the matched template policy document 526, wherein each of the set of controls 528 is a measurable component exposed by a services provider of the organization, and wherein the set of controls 528 indicate a level of compliance with the template policy document 526; and presenting 510, by the security and compliance monitor 200 on the user computing system 520, the set of controls 528 associated with the matched template policy document 526 as controls for the user-generated policy document 522.

The method of FIG. 6 differs from the method of FIG. 5, however, in that the method of FIG. 6 further includes accessing 602, from the services providers of the organization 204, each control of the set of controls 528 to retrieve a control status 620; and generating 604 a trust center report 210 using the control statuses 620 indicating a level of compliance with the user-generated policy document 522.

Accessing 602 each control of the set of controls 528 to retrieve a control status 620 may be carried out by issuing a control status request to the organization services providers 204 and receiving, in response, the control status responses. The control status requests may be commands submitted via a command line interface exposed by the organization services providers 204. The control status responses may be state specifications provided in response to the submitted commands.

Accessing 602 each control of the set of controls 528 to retrieve a control status 620 may be carried out periodically. Specifically, each control status response may be retrieved at the expiration of a period of time set for each control status. The period of time may be different for each control status and may be based on various factors, including, for example, the severity of failing the control, historical data indicating frequency of failure events, and system efficiency.

Once the control status responses are retrieved, the control status may then be determined. Determining the control status for each control of the trust center report 210 based on the control status responses may be carried out by translating the control status responses into control statuses 620 for each control of the trust center report 210. Specifically, the control status responses may include additional information unrelated to the individual control status. Further, the control status responses may not succinctly indicate the control status of the control. Consequently, the security and compliance monitor 200 may perform various operations on the control status responses in order to extract the control status 620. The security and compliance monitor 200 may compare elements in a control status response to a value (such as a minimum or maximum value allowed) to determine the control status for the control.

For example, for one control status, the security and compliance monitor 200 may generate a command requesting the frequency of data backups performed on a particular data set. The security and compliance monitor 200 may then send the command to a cloud services provider via a command line interface. In response, the security and compliance monitor 200 may receive a state specification detailing that the particular data set is backed up once a day. The security and compliance monitor 200 may then extract the frequency of once a day from the control status response and compare that value with the minimum value for the control. If the frequency of once a day is at least as frequent as required by the trust center report, then the control status for that control would be "in compliance".

Generating 604 a trust center report 210 using the control statuses 620 indicating a level of compliance with the user-generated policy document 522 may be carried out by identifying the control status indicators corresponding to the control statuses 620. The control status indicators and the control identifiers may then be organized into the trust center report 210.

Figure 7:
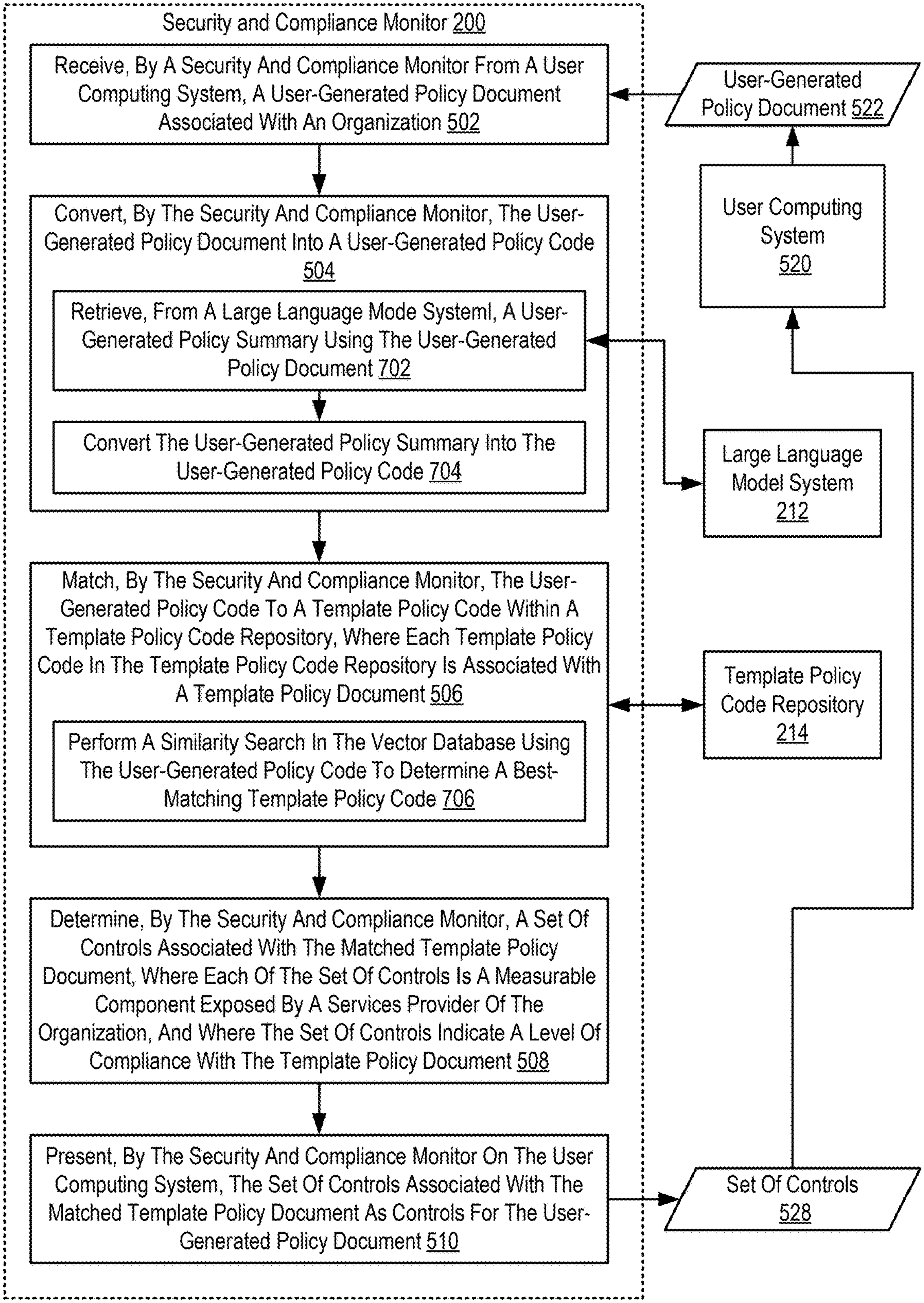
FIG. 7 sets forth a flow chart illustrating an exemplary method for determining policy-based controls for real-time security and compliance monitoring according to embodiments of the present invention.

For further explanation, FIG. 7 sets forth a flow chart illustrating a further exemplary method for determining policy-based controls for real-time security and compliance monitoring according to embodiments of the present invention that includes receiving 502, by a security and compliance monitor 200 from a user computing system 520, a user-generated policy document 522 associated with an organization; converting 504, by the security and compliance monitor 200, the user-generated policy document 522 into a user-generated policy code 524; matching 506, by the security and compliance monitor 200, the user-generated policy code 524 to a template policy code within a template policy code repository 214, wherein each template policy code in the template policy code repository 214 is associated with a template policy document; determining 508, by the security and compliance monitor 200, a set of controls 528 associated with the matched template policy document 526, wherein each of the set of controls 528 is a measurable component exposed by a services provider of the organization, and wherein the set of controls 528 indicate a level of compliance with the template policy document 526; and presenting 510, by the security and compliance monitor 200 on the user computing system 520, the set of controls 528 associated with the matched template policy document 526 as controls for the user-generated policy document 522.

The method of FIG. 7 differs from the method of FIG. 5, however, in that converting 504, by the security and compliance monitor 200, the user-generated policy document 522 into a user-generated policy code 524 includes retrieving 702, from a large language model system 212, a user-generated policy summary using the user-generated policy document 522; and converting 704 the user-generated policy summary into the user-generated policy code 524.

Retrieving 702, from a large language model system 212, the user-generated policy summary using the user-generated policy document 522 may be carried out by security and compliance monitor 200 submitting the user-generated policy document 522 to the LLM system 212 with an instruction to summarize the user-generated policy document 522. The LLM system 212 may then use the model to generate the user-generated policy summary and send the user-generated policy summary to the security and compliance monitor 200. The security and compliance monitor 200 may include an instruction to create the user-generated policy summary of a particular size (e.g., 500 words or the average length of a template policy paragraph). Converting 704 the user-generated policy summary into the user-generated policy code 524 may be carried out by transforming the user-generated policy summary into a mathematical representation. The user-generated policy or user-generated policy summary may be vectorized as part of the conversion process into the user-generated policy code.

The method of FIG. 7 also differs from the method of FIG. 5, however, in that matching 506, by the security and compliance monitor 200, the user-generated policy code 524 to a template policy code within a template policy code repository 214, wherein each template policy code in the template policy code repository 214 is associated with a template policy document includes performing 706 a similarity search in a vector database using the user-generated policy code to determine a best-matching template policy code. Performing 706 a similarity search in the vector database using the user-generated policy code to determine a best-matching template policy code may be carried out by iterating through the vector database with the vector representing the user-generated policy code to obtain the most similar vector representing the template policy code.

Advantages and features of the present disclosure can be further described by the following statements:

1. A method of receiving, by a security and compliance monitor from a user computing system, a user-generated policy document associated with an organization; converting, by the security and compliance monitor, the user-generated policy document into a user-generated policy code; matching, by the security and compliance monitor, the user-generated policy code to a template policy code within a template policy code repository, wherein each template policy code in the template policy code repository is associated with a template policy document; determining, by the security and compliance monitor, a set of controls associated with the matched template policy document, wherein each of the set of controls is a measurable component exposed by a services provider of the organization, and wherein the set of controls indicate a level of compliance with the template policy document; and presenting, by the security and compliance monitor on the user computing system, the set of controls associated with the matched template policy document as controls for the user-generated policy document.

2. The method of statement 1, further comprising: accessing, from the services providers of the organization, each control of the set of controls to retrieve a control status; and generating a trust center report using the control statuses indicating a level of compliance with the user-generated policy document.

3. The method of statement 2 or statement 1, wherein converting the user-generated policy document into the user-generated policy code comprises: retrieving, from a large language model system, a user-generated policy summary using the user-generated policy document; and converting the user-generated policy summary into the user-generated policy code.

4. The method of statement 3, statement 2, or statement 1, wherein converting the user-generated policy summary into the user-generated policy code comprises vectorizing the user-generated policy summary.

5. The method of statement 4, statement 3, statement 2, or statement 1, wherein the template policy code repository is a vector database, and wherein matching the user-generated policy code to the template policy code within the template policy code repository comprises performing a similarity search in the vector database using the user-generated policy code to determine a best-matching template policy code.

6. The method of statement 5, statement 4, statement 3, statement 2, or statement 1, wherein matching the user-generated policy code to the template policy code within the template policy code repository comprises using the user-generated policy code as a key into the template policy code repository to find a best-matching template policy code.

7. The method of statement 6, statement 5, statement 4, statement 3, statement 2, or statement 1, wherein each template policy code in the template policy code repository is generated by dividing a template policy document into chunks and vectorizing each of the chunks to create the template policy code.

8. The method of statement 7, statement 6, statement 5, statement 4, statement 3, statement 2, or statement 1, wherein the template policy document is a privacy policy document.

9. The method of statement 8, statement 7, statement 6, statement 5, statement 4, statement 3, statement 2, or statement 1, wherein at least one of the services providers of the organization comprise a cloud services provider.

10. The method of statement 9, statement 8, statement 7, statement 6, statement 5, statement 4, statement 3, statement 2, or statement 1, wherein the user-generated policy document comprises a plurality of obligations assigned to the organization.

One or more embodiments may be described herein with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

While particular combinations of various functions and features of the one or more embodiments are expressly described herein, other combinations of these features and functions are likewise possible. The present disclosure is not limited by the particular examples disclosed herein and expressly incorporates these other combinations.

What is claimed is:

1. A method, comprising:

receiving, by a security and compliance monitor from a user computing system, a user-generated policy document associated with an organization;

converting, by the security and compliance monitor, the user-generated policy document into a user-generated policy code including vectorizing the user-generated policy document to generate a vector representation configured for comparison with template policy codes within a template policy code repository, wherein each template policy code in the template policy code repository is associated with a template policy document;

matching, by the security and compliance monitor and based on the comparison with the template policy codes, the user-generated policy code to a template policy code within the template policy code repository;

determining, by the security and compliance monitor, a set of controls associated with the template policy document, wherein each of the set of controls is a measurable component exposed by a services provider of the organization, and wherein the set of controls indicate a level of compliance with the template policy document; and presenting, by the security and compliance monitor on the user computing system, the set of controls associated with the template policy document as controls for the user-generated policy document.

2. The method of claim 1, further comprising:

accessing, from the services providers of the organization, each control of the set of controls to retrieve a control status; and generating a trust center report using the control statuses indicating a level of compliance with the user-generated policy document.

3. The method of claim 1, wherein converting the user-generated policy document into the user-generated policy code comprises:

retrieving, from a large language model system, a user-generated policy summary using the user-generated policy document; and converting the user-generated policy summary into the user-generated policy code.

4. The method of claim 3, wherein converting the user-generated policy summary into the user-generated policy code comprises vectorizing the user-generated policy summary.

5. The method of claim 1, wherein the template policy code repository is a vector database, and wherein matching the user-generated policy code to the template policy code within the template policy code repository comprises performing a similarity search in the vector database using the user-generated policy code to determine a best-matching template policy code.

6. The method of claim 1, wherein matching the user-generated policy code to the template policy code within the template policy code repository comprises using the user-generated policy code as a key into the template policy code repository to find a best-matching template policy code.

7. The method of claim 1, wherein each template policy code in the template policy code repository is generated by dividing a template policy document into chunks and vectorizing each of the chunks to create the template policy code.

8. The method of claim 1, wherein the template policy document is a privacy policy document.

9. The method of claim 1, wherein at least one of the services providers of the organization comprise a cloud services provider.

10. The method of claim 1, wherein the user-generated policy document comprises a plurality of obligations assigned to the organization.

11. A system, comprising:

a memory; and a processing device, operatively coupled to the memory, the processing device configured to:

receive, from a user computing system, a user-generated policy document associated with an organization;

convert the user-generated policy document into a user-generated policy code including vectorizing the user-generated policy document to generate a vector representation configured for comparison with template policy codes within a template policy code repository, wherein each template policy code in the template policy code repository is associated with a template policy document;

match, based on the comparison with the template policy codes, the user-generated policy code to a template policy code within the template policy code repository, wherein each template policy code in the template policy code repository is associated with a template policy document;

determine a set of controls associated with the template policy document, wherein each of the set of controls is a measurable component exposed by a services provider of the organization, and wherein the set of controls indicate a level of compliance with the template policy document; and present, on the user computing system, the set of controls associated with the template policy document as controls for the user-generated policy document.

12. The system of claim 11, wherein the processing device is further configured to:

accessing, from the services providers of the organization, each control of the set of controls to retrieve a control status; and generating a trust center report using the control statuses indicating a level of compliance with the user-generated policy document.

13. The system of claim 11, wherein converting the user-generated policy document into the user-generated policy code comprises:

retrieving, from a large language model system, a user-generated policy summary using the user-generated policy document; and converting the user-generated policy summary into the user-generated policy code.

14. The system of claim 13, wherein converting the user-generated policy summary into the user-generated policy code comprises vectorizing the user-generated policy summary.

15. The system of claim 11, wherein matching the user-generated policy code to the template policy code within the template policy code repository comprises querying a large language model system using the user-generated policy code and the template policy code repository to receive a best-matching template policy code.

16. The system of claim 11, wherein matching the user-generated policy code to the template policy code within the template policy code repository comprises using the user-generated policy code as a key into the template policy code repository to find a best-matching template policy code.

17. The method of claim 1, wherein each template policy code in the template policy code repository is generated by dividing a template policy document into chunks and vectorizing each of the chunks to create the template policy code.

18. The system of claim 11, wherein the template policy document is a privacy policy document.

19. The system of claim 11, wherein the services providers of the organization comprise a cloud services provider.

20. A non-transitory computer readable storage medium storing instructions which, when executed, cause a processing device to:

receive, from a user computing system, a user-generated policy document associated with an organization;

convert the user-generated policy document into a user-generated policy code including vectorizing the user-generated policy document to generate a vector representation configured for comparison with template policy codes within a template policy code repository, wherein each template policy code in the template policy code repository is associated with a template policy document;

match, based on the comparison with the template policy codes, the user-generated policy code to a template policy code within a template policy code repository, wherein each template policy code in the template policy code repository is associated with a template policy document;

determine a set of controls associated with the template policy document, wherein each of the set of controls is a measurable component exposed by a services provider of the organization, and wherein the set of controls indicate a level of compliance with the template policy document; and present, on the user computing system, the set of controls associated with the template policy document as controls for the user-generated policy document.

* * * * *